June 8, 1943.  R. R. CHAPPELL ET AL  2,321,361
SHUTTER MECHANISMS
Filed March 7, 1940
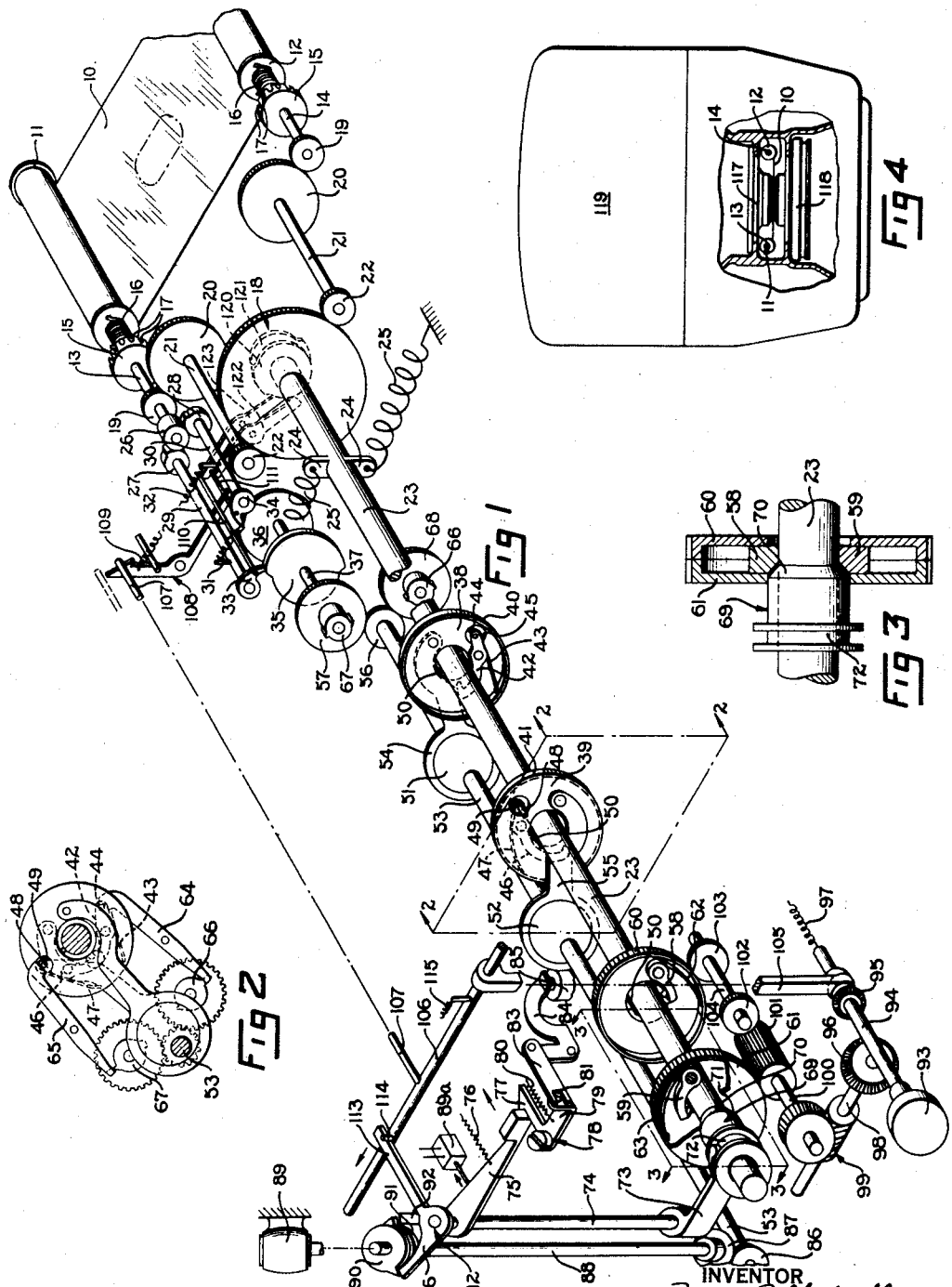
INVENTOR
Ralph R. Chappell
BY Rutger B. Colt
F. Bascom Smith
ATTORNEY Patented June 8, 1943

2,321,361

UNITED STATES PATENT OFFICE 2,321,361

SHUTTER MECHANISM

Ralph R. Chappell, Richmond, Va., and Rutger B. Colt, Baltimore, Md., assignors to Bendix Aviation Corporation, South Bend, Ind., a corporation of Delaware Application March 7, 1940, Serial No. 322,718

20 Claims. (Cl. 95—57)

This invention relates to photographic apparatus, and more particularly to shutter mechanisms.

The advantage of mounting a shutter between the lens elements of a camera or in close proximity to the lens instead of at the focal plane has been long recognized in the photographic art. However, considerable difficulty has been encountered in providing a suitable shutter mechanism of this kind for a camera, for example, having a wide angle lens, because of the limited space available for mounting the shutter between the lens elements and because of the movement necessary to accomplish an exposure when a suitable shutter, such as a curtain, is utilized in this limited space.

Accordingly, it is an object of the present invention to provide a shutter actuating mechanism operable in combination with a curtain shutter and adapted to properly actuate said shutter when the latter is mounted between the lens elements of a camera.

It is a further object of the present invention to provide an effective shutter actuating mechanism operable at high speeds with a minimum inertia effect.

A still further object is to provide a novel mechanism adapted to impart a smooth and uniformly accelerated and decelerated movement to a camera shutter.

Still another object is to provide a shutter actuating mechanism in combination with a curtain shutter whereby said shutter is started and stopped without impact or shock.

A further object is to provide a shutter mechanism adapted to move at a variable speed and to effect an exposure when moving at its maximum speed.

A still further object is to provide a novel actuating mechanism having a wide range of operating speeds and novel means in combination with said mechanism whereby the speed of operation of said mechanism may be readily and accurately controlled.

A further object is to provide a novel mechanism of the above kind which is compact, durable and constituted of a minimum number of moving parts.

Another object is to provide a novel driving mechanism in combination with novel means for energizing and holding said mechanism against release, said mechanism being free of said holding and energizing means when released for operation.

These and other objects and novel features of the present invention will more fully appear from the following detailed description when the same is read in connection with the accompanying drawing. It is to be expressly understood, however, that the drawings are for purposes of illustration only and are not intended as a definition of the limits of the invention, reference being primarily had for this latter purpose to the appended claims.

In the drawing, wherein like reference characters refer to like parts throughout the several views, Fig. 1 is an exploded isometric view showing somewhat diagrammatically a form of shutter mechanism embodying the present invention;

Fig. 2 is a section taken substantially along plane 2—2 of Fig. 1;

Fig. 3 is a section taken substantially along plane 3—3 of Fig. 1; and

Fig. 4 is a view in elevation with parts broken away showing the shutter mechanism of Fig. 1 operatively mounted in a camera.

In the illustrated embodiment of the invention, a shutter curtain 10 is wound on a pair of spaced and substantially parallel rolls 11 and 12, said curtain preferably having the ends thereof attached to said rolls and being adapted to move in a plane between said rolls. Rolls 11 and 12 are freely mounted on shafts 13 and 14, respectively, and said rolls are secured by novel means to said shafts to be rotatable therewith and to have a limited movement relative thereto, said novel means being alike for each roll and shaft, and comprising a cup-shaped bracket 15 rigidly secured to the shaft and a spring 16. Bracket 15 on shaft 13, for example, is provided with notches 17 in the outside wall thereof and is axially spaced from the end of roll 11 with the open end thereof facing said roll. Spring 16 is wound about shaft 13 in the space between said bracket and the end of roll 11, and one end of said spring is fixed to the end of said roll, while the other end is fixed to the bracket by extending through one of notches 17.

Springs 16 are used as the connecting means between rolls 11 and 12 and the shafts 13 and 14 in order to transmit the motion of said shafts to said rolls while permitting a limited movement of said rolls relative to said shafts. Thus, slight variations in angular speeds of the rolls as the number of layers of the curtain on said rolls is varied can take place and any deleterious effects, such as an excessive stretching of the curtain, are prevented. Furthermore, by this novel connection, it is possible to maintain curtain 10 under tension and the degree of tension normally applied to the curtain can be conveniently varied any desirable amount by changing the location of the end of spring 16 to another one of notches 17.

Shafts 13 and 14 are adapted to be rotated in the same direction and at the same speed by a drive comprising a main driving member, such as a gear 18, said member being preferably connected to each of said shafts by like trains of gears. Each of said trains is shown as comprising a gear 19 mounted on each of shafts 13 and 14 and drivably engaging a gear 20 which is secured and rotates with a shaft 21, the latter carrying a gear 22 which meshes with gear 18.

Gear 18 is adapted to drive curtain 10 and to cause the opening in said curtain to move from one of rolls 11, 12 to the other, thus exposing the film for a period determined by the rate at which the curtain opening moves between said rolls. In order to drive curtain 10 at a desired speed, gear 18 is operatively connected to a novel driving mechanism comprising a main shaft 23 to which said gear is keyed or otherwise secured. A pair of radially extending lugs 24 located diametrically opposite each other are integrally formed with or rigidly fixed to shaft 23, and a pair of springs 25 are adapted to operatively engage said lugs. Each of said springs is fixed at one end to a stationary member and at the other end to one of said lugs, and each is tensioned so as to apply a turning torque to shaft 23 when displaced from neutral position, the magnitude of said torque depending on the amount of displacement. The neutral or equilibrium position of the drive mechanism, shown in Fig. 1, occurs when lugs 24 are horizontal and for this position of shaft 23 and said lugs, curtain 10 is centrally located on rolls 11 and 12 with its opening midway between said rolls.

In operation, the driving mechanism is held displaced from the central or neutral position when stationary, and this is accomplished by the operation of a braking mechanism which preferably comprises a drum 26 attached to an extension of shaft 13, said drum having the surface thereof engaged by suitable braking members, such as cams 27 and 28. Only one of said braking members is normally in braking engagement with the periphery of drum 26, and each of said members when engaging said drum is adapted to hold the same against rotation in only one direction. This is effected by mounting members 27 and 28 on shafts 29 and 30, respectively, and applying a turning torque to said shafts by means, such as springs 31 and 32, respectively. Springs 31 and 32 normally maintain a pair of cam followers 33 and 34 in engagement with a pair of cams 35 and 36, respectively, said cam followers being mounted on shafts 29 and 30, respectively, and both of said cams being secured on a shaft 37. Cams 35 and 36 are shaped to keep one or the other of brake members 27 and 28 disengaged from drum 26, giving said drum freedom of movement in one direction. These cams are suitably timed by means of a connection to be more fully described hereinafter.

Springs 25, if displaced from neutral position and then released, drive gear 18 and actuate curtain 10 to effect an exposure, and the motion of said springs approximates a simple harmonic motion. However, only a single oscillation of the motion takes place since the return movement of shaft 23 is prevented by the operation of brake means 26, 27, 28. Thus, the shutter mechanism is held at the end of each exposure with the curtain aperture wound on one of rolls 11, 12, and it is to be noted that the shutter mechanism comes to rest smoothly in a uniformly decelerating motion.

Novel means are provided for driving shaft 23 to displace lugs 24 and springs 25 a sufficient distance so that when said springs are released the curtain will be driven at a desired speed. In the illustrated embodiment, said means comprise a pair of discs 38 and 39, having peripheral flanges 40 and 41, respectively, and being freely mounted adjacent each other on shaft 23. A winding pawl 42 is carried by disc 38 and is pivotally mounted on the flanged side of said disc and urged into engagement with shaft 23 by suitable means, such as a resilient member 43, the latter being attached to one end of said pawl and bearing against flange 40. A pin or lug 44 is formed with or fixed to pawl 42 and projects through an opening 45 in disc 38 to the other side thereof. A pawl 46 similar to pawl 42 is similarly mounted on disc 39 but is located on the opposite side of shaft 23 from pawl 42. Pawl 46 is also urged into engagement with shaft 23 by a resilient member 47 and is provided with a lug 48 extending through an opening 49 in disc 39. Lugs or pins 44 and 48 are adapted to be engaged to render pawls 42 and 46 inoperative when said discs are stationary in a manner more fully described hereafter.

A key 50 is mounted in said shaft and is adapted to be engaged by one of pawls 42, 46 to wind said shaft in the direction determined by the direction of movement to be imparted to curtain 10. As pointed out heretofore, shaft 23 is normally held displaced from neutral position, and the direction of this displacement is the direction in which shaft 23 is to be rotated to tension springs 25 for properly driving curtain 10. Thus, as pawls 42, 46 are moved from the neutral position in opposite directions, one of said pawls at some point in the movement thereof will engage key 50 and rotate shaft 23 further from neutral position.

In order to rotate discs 38 and 39 in opposite directions, suitable means, such as eccentrics 51 and 52, are provided, said eccentrics being mounted on a drive shaft 53 and being connected to said discs by eccentric straps or arms 54 and 55. Strap 54 is pivotally secured to disc 38 on one side of shaft 23, and strap 55 is secured to disc 39 on the other side of said shaft so that a single complete revolution of eccentrics 51 and 52 rotates each of discs 38 and 39 about 90° in opposite directions and then returns said discs to their original positions. At the completion of a half revolution of drive shafts 53, eccentrics 51, 52 have moved discs 38, 39 through a maximum angular displacement, and one of said discs by means of its pawl has tensioned springs 25 a maximum amount. To permit the partial return of shaft 23 with discs 38 and 39, shaft 53 is connected to shaft 37 and cam members 35 and 36 cause brake members 27 and 28 to operate in a reverse direction at the beginning of the second half revolution of shaft 53. As shown, gears 56 and 57, respectively, are mounted on the ends of shafts 53 and 37 and mesh with each other to provide the connection between said shafts.

The return of shaft 23 is prevented at a predetermined point in the movement thereof by novel means comprising a pair of firing pawls 58 and 59, one of said pawls being adapted to engage key 50. Pawls 58 and 59 are pivotally mounted on the faces of gears 60 and 61, respectively, and are urged by resilient members 62 and 63, respectively, into engagement with shaft 23, said pawls being mounted on opposite sides of said shaft and preferably at equal angular distances from the neutral position of key 50. Accordingly, each of said pawls is set to stop shaft 23 at the same angular distance from neutral position and with a like torque being applied by springs 25 to said shaft.

While shaft 23 is held by one of firing pawls 58, 59, shaft 53 completes its single revolution returning discs 38, 39 and eccentrics 51 and 52 to neutral position. If said firing pawls are thereafter released, springs 25 drive curtain shutter 10 in the desired direction for an exposure, and when this occurs it is desirable to have shaft 23 free of winding pawls 42 and 46 to permit said shaft to rotate past the neutral position. Accordingly, pins 44, 48 attached to said pawls are adapted to be engaged by a pair of levers 64 and 65 (shown only in Fig. 2) whenever discs 38 and 39 are in neutral position and to be held by said levers a sufficient distance away from said shaft to permit free movement of key 50. Levers 64, 65 are pivoted intermediate the ends thereof and are actuated by cams 66 and 67 (Figs. 1 and 2), respectively, which are operatively connected to shaft 53, cam 67 being mounted on shaft 37, and cam 66 being secured to a gear 68 which meshes with gear 56. Thus, the position of the former shaft controls the operation of levers 64 and 65, and pawls 42 and 46 become free to engage key 50 only when said shaft is angularly displaced from central or neutral position.

Firing pawls 58 and 59 are adapted to be moved radially away from shaft 23 and out of engagement with key 50 to permit springs 25 to drive shutter curtain 10, and this is accomplished by a member 69 (Figs. 1 and 3) slidably mounted for reciprocal movement on shaft 23. Axial movement of said member in the direction of gear 61 causes conical end 70 of said member to project through opening 71 in said gear and engage both of said pawls, further movement of the inclined surface of end 70 disengaging said pawls from said shaft. Suitable means are provided to control the movement of member 69 and the release of said pawls and, as shown, said means comprise a grooved collar 72 secured to or formed with said member, and an arm 73 bifurcated at one end and secured at the other end to a shaft 74. The bifurcated end of said arm engages the groove in collar 72 and rotary movement of shaft 74 imparts an axial movement to member 69. To actuate said shaft and release firing pawls 58, 59, novel release apparatus is provided and comprises a lever 75 secured to said shaft and extending radially therefrom. Suitable means in the form of a spring 76 apply a force tending to turn said lever in a direction to release said pawls, but this is normally prevented by a pawl 77 which engages the free end of said lever. The latter pawl constitutes one arm of an element 78 shaped and pivoted like a bell crank lever, the other arm 79 thereof being engaged by a spring 80 which applies a sufficient force to said bell crank lever to keep said pawl in engagement with the end of lever 75. To trip pawl 77 and free the latter lever so as to release the shutter drive, a pin 81 formed with or secured to the end of arm 79 is engaged by the bifurcated end of a link 83, said link being adapted to transmit the pivotal movement of a trip lever 84 to arm 79. It is to be noted that a force only sufficient to overcome the resistance of spring 80 need be applied to lever 84 to release the firing pawls, and the actual force which moves the latter is provided by spring 76. Trip lever 84 may be actuated manually or, for example, by the operation of a solenoid 85, the circuit of said solenoid being automatically closed, for example, at predetermined intervals by an interval meter or by the manual operation of a switch.

Novel means are provided for driving shaft 53 and energizing the spring drive after each shutter release, said means also being adapted to cock lever 75. As shown, this driving and cocking mechanism comprises a pair of bevel gears 86 and 87 meshing with each other, gear 86 being mounted on shaft 53 and gear 87 on a shaft 88. The latter shaft may be rotated manually or by a power drive, such as an electric motor 89, and it is preferable to have shafts 53 and 88 rotate at equal angular speeds. A cam 90 is provided on shaft 88 for the purpose of limiting the movement of the driving means so that the latter imparts only a single revolution to said shaft, one revolution being sufficient, as heretofore pointed out, in order to energize the spring drive of the shutter. A switch (not shown) may be actuated by said cam in order to shut off motor 89 at the completion of one revolution.

To cock lever 75, a second cam 91 is mounted on shaft 88 and is adapted to engage a radially extending portion or trigger 92 provided on said lever. When shaft 88 is driven to energize the shutter drive, cam 91 is rotated and moves trigger 92 and thus moves arm 75 into engagement with pawl 77.

The speed at which the aperture in shutter curtain 10 is moved from one of rolls 11, 12 to the other depends on the tension in springs 25 at the time shaft 23 is released and this, in turn, is a function of the amount which springs 25 have been displaced from neutral position. The displacement of springs 25 prior to release depends on the position of firing pawls 58, 59 relative to the neutral position of key 50 and, accordingly, by changing the position of said pawls it is possible to vary the speed at which curtain 10 is driven. As shown, novel means are provided for accomplishing this, said means comprising a readily accessible knob 93 mounted on a shaft 94 which is adapted for reciprocal movement so that by pulling knob 93 a bevel gear 95 mounted on said shaft is caused to operatively engage a bevel gear 96. Normally, gears 95 and 96 are held out of engagement by suitable resilient means, such as a spring 97 which is secured to shaft 94. Bevel gear 96 is mounted on a shaft 98 and said shaft is connected by a worm and gear drive 99 to a shaft 100 upon which a gear 101 is mounted. The latter gear meshes with gear 61 which carries pawl 59 and is also connected by means of gears 102 and 103 mounted on a single shaft 104 to gear 60 upon which pawl 58 is mounted. Thus, rotation of knob 93 moves gears 60 and 61 and, therefore, pawls 58 and 59 in opposite directions, the connecting mechanism being suitably selected to move gears 60 and 61 equal distances from the neutral position of key 50. In order that knob 93 may move said pawls in both directions when one of said pawls is engaging said key, novel interlocking means are provided for rendering inoperative the braking mechanism which opposes the return movement of shaft 23 in the direction which will further tension springs 25. In the illustrated embodiment, said means comprise a lever 105 which is secured at one end to a shaft 106 and has the other end thereof engaging shaft 94 to be movable therewith. When knob 93 is pulled, it causes lever 105 to rotate shaft 106, and a pin 107 rigidly fixed to said shaft and extending radially therefrom is rotated with said shaft. Pin 107 is adapted to engage the inclined surface of one arm of a bell crank lever 108 and pivot the latter against the resistance of a spring 109 so that the other arm of said lever raises a pair of pins 110 and 111. The latter pins are connected to cam followers 33 and 34, respectively, and when raised move said cam followers in a direction to render brake members 27 and 28 inoperative.

When pawls 58 and 59 are disengaged from shaft 23, i. e., when lever 75 has been tripped and remains in released position, it is unnecessary and undesirable to resort to the above interlocking means since neither gears 60 and 61 nor said pawls are connected to shaft 23, and the braking members 27, 28 offer no resistance to the movement of pawls 58 and 59. Furthermore, if said braking members are rendered inoperative at this point in the cycle of operations, springs 25 will be free to oscillate shaft 23 until the latter comes to rest in neutral position, which is undesirable. Accordingly, novel means are provided for rendering the above described interlocking mechanism inoperative when lever 75 is in released position and said means preferably comprise a bell crank lever 112 mounted on shaft 74 for rotation with said shaft and having an arm 113 engaging a pin 114 secured to shaft 106. Suitable means, such as a spring 115 attached to shaft 106, apply a force tending to move the latter axially and this motion is opposed and prevented by arm 113 when shaft 74 is in a position corresponding to the cocked position of lever 75. However, when lever 75 is released, shaft 74 is rotated and arm 113 moves away from pin 114, permitting shaft 106 to be moved axially and this, in turn, displaces pin 107 so that the latter cannot engage the arm of bell crank lever 108 in order to pivot said lever. Thus, when firing pawls 58 and 59 are held in disengaged position by member 69, the interlocking mechanism is inoperative and the position of said pawls can be changed by knob 93 without affecting the operation of brake members 27, 28. When lever 75 is thereafter cocked, shaft 106 is moved back axially by arm 113, and pin 107 is again located over bell crank lever 108, being in a position to engage and pivot said bell crank lever.

It is to be noted that the braking force exerted by cam members 27 and 28 is not applied by means of springs 31 and 32 but is due to the shape of said members, each of the latter having an angle of rise which is less than the angle of friction thereof. Movement of drum 26 when one of said members is only lightly engaging said drum will, depending on the direction of movement, either drive said member into tight gripping engagement with said drum or will permit said drum to rotate with a minimum frictional resistance. Accordingly, springs 31 and 32 are very light and when drum 26 is rotated, as for example, during an exposure, in the direction in which it is free to rotate, there is only a slight drag opposing the movement of curtain 10. It is possible to eliminate even this slight drag in the event very high curtain speeds are desired by means, for example, of a pair of cams 120 and 121 mounted on shaft 23, said cams being adapted to actuate levers 122 and 123, respectively, and to cause the latter to engage and lift pins 111 and 110, respectively. The one of members 27 and 28 in engagement with drum 26 is thus disengaged from said drum after gear 18 begins to move to effect an exposure, and said member is maintained in disengaged position until curtain 10 has passed through central position.

If it is desired to wind the shutter mechanism automatically, lever 75 when tripped actuates a switch 89a and said switch starts motor 89. Cam 90 on shaft 88 is adapted to engage arm 116 of bell crank lever 112 at the completion of a single revolution, said arm preventing further rotation of said cam and shaft until lever 75 is tripped and said arm is moved away from said cam.

In operation, shutter curtain 10 is preferably mounted between lens elements 117, 118 of a camera 119 (Fig. 4). At the completion of an exposure, for example, which was effected by moving the opening in curtain 10 from roll 12 to roll 11, springs 25 are displaced from central or neutral position and are held displaced by brake member 27 which engages drum 26. The tripping of lever 75 preferably starts motor 89 and the latter drives shafts 88 and 53 and rotates discs 38 and 39 in opposite directions by means of eccentrics 51 and 52. Pawl 46 engages key 50 as disc 39 rotates in the direction in which said key is displaced from neutral position. At the completion of a half revolution of eccentric 52, pawl 46 has displaced shaft 23 and springs 25 a maximum amount, and lever 75 has preferably been cocked by cam 91 so that firing pawl 59 is free to engage key 50. At this point, cams 35 and 36 which rotate together with shaft 53 have caused braking member 28 instead of member 27 to engage drum 26. The further rotation of eccentrics 51, 52 begins to return disc 39 to its original position and pawl 46 remains in engagement with key 50 so that shaft 23 moves with said pawl until engaged by firing pawl 59 and thereafter shaft 23 is held against movement by the latter pawl. When eccentrics 52 and 51 complete a single revolution and return to neutral position, discs 38 and 39 are likewise returned to neutral position, and cams 66 and 67 actuate levers 64 and 65, moving pawls 42 and 46 away from shaft 23.

At this point in the cycle of operations, the spring drive is properly energized, being displaced a predetermined distance from neutral position, and lever 75 is held by pawl 77. If the exposure timing is to be changed, knob 93 is pulled to release brake member 28 and causes bevel gears 95 and 96 to mesh, connecting said knob to gears 60 and 61 and making it possible to move pawl 59 in either direction to vary the displacement of springs 25.

When an exposure is to be taken, lever 84 is tripped, for example, by means of solenoid 85 and disengages pawl 77 from lever 75 so that spring 76 pivots the latter lever to cause member 69 to release pawl 59 and to free shaft 23. The torque applied to said shaft by springs 25 turns the latter at a variable speed which attains a maximum value when the spring moves past neutral position and then decreases as the displacement from neutral position increases, the motion approximating a simple harmonic motion. When springs 25 are in neutral position, the opening in curtain 10 passes between lens elements 117, 118 and exposes the film. Thus, the curtain is moving at maximum speed at the time of exposure, and after exposure the speed of the curtain decreases uniformly until the latter is brought to rest by springs 25 so that no shock or impact is produced. The return movement of the curtain is prevented by brake member 28, the opening in the curtain being now wound on roll 12. The above cycle of operations is now repeated with pawl 42 accomplishing the winding and pawl 58 holding the shaft after winding.

There is thus provided a novel shutter mechanism having a curtain shutter adapted for operation between the lenses of a camera. The curtain is moved smoothly and without shock or impact by the novel shutter drive, and the exposure is effected when the curtain is moving at its highest velocity in a movement approximating a simple harmonic motion. Accordingly, very high curtain speeds are attained in the mechanism with a minimum of inertia effects because the driving mechanism is free of the winding and holding mechanisms during exposure. There is also provided novel means for varying the displacement of the spring drive to control the exposure speeds. The novel control means include interlocking means for rendering the braking mechanism of the spring drive inoperative when said mechanism if operative might interfere with the operation of said control means.

Although only a single embodiment of the invention has been illustrated and described, it is to be expressly understood that the same is not limited thereto. Various changes may be made in the design and arrangement of the parts as will now be apparent to those skilled in the art without departing from the spirit and scope of the invention. For a definition of the invention, reference will be had primarily to the appended claims.

What is claimed is:

1. In apparatus of the class described, a shutter mechanism, means operatively connected to said mechanism and adapted to actuate the latter, said means comprising resilient means, a member connected to said resilient means, a pair of mechanisms associated with said member, means drivably connected to said mechanisms to rotate the latter in opposite directions, said mechanisms being adapted to alternately engage said member to successively tension said resilient means in opposite directions, means adapted to engage and hold said member against movement after said resilient means are tensioned, and means operable to release said holding means to permit said resilient means to actuate said shutter mechanism.

2. In a shutter mechanism, shutter means, resilient drive means directly and positively connected at all times to said shutter means, said drive means and said shutter means being so constructed and arranged that when said drive means is in its equilibrium position the shutter means is in its exposure position, means for energizing said drive means by displacing the latter from equilibrium position, means for holding said drive means in displaced position, means operable to cause said holding means to release said drive means, said drive means when released being free to move in substantially a single oscillation of a simple harmonic motion to effect an exposure, and braking means effective to prevent return movement of said drive means in the direction of its equilibrium position at the completion of said single oscillation of movement.

3. In a shutter mechanism, shutter means, resilient drive means directly and positively connected at all times to said shutter means, said drive means and said shutter means being so connected and arranged that when said drive means is in its equilibrium position the shutter means is in its exposure position, means for energizing said drive means by displacing the latter from equilibrium position, means for holding said drive means in displaced position, cam means operable to cause said holding means to release said drive means, said drive means when released being free to move in substantially a simple harmonic motion to cause said shutter mechanism to effect an exposure, and braking means operable to hold said shutter means and said drive means against return movement at the completion of a single oscillation.

4. In camera apparatus, a shutter mechanism, actuating means operatively connected to said mechanism and adapted to move the latter when released after being energized, means for energizing said actuating means, braking means holding said shutter mechanism against movement in only one direction, pawl means for holding said actuating means in energized position, mechanism operable to control the position of said pawl means to control the energy stored in said actuating means prior to the release thereof, and interlocking means actuated by the operation of said last-named mechanism to render said braking means inoperative.

5. In camera apparatus, a shutter mechanism, actuating means operatively connected to said mechanism and adapted to move the latter when released after being energized, means for energizing said actuating means, braking means holding said shutter mechanism against movement in only one direction, pawl means for holding said actuating means in energized position, mechanism operable to control the position of said pawl means to control the energy stored in said actuating means prior to the release thereof, interlocking means actuated by the operation of said last-named mechanism to render said braking means inoperative, and control means connected to said interlocking means and operable by said energizing means, said control means being adapted to render said interlocking means inoperative when said pawl means is disengaged from said actuating means.

6. In apparatus of the class described, a shutter mechanism and means operatively connected to said mechanism to actuate the latter, said means comprising spring means, a pair of mechanisms, eccentrics drivably connected to said mechanisms for actuating the latter in opposite directions, means adapted to alternately connect said mechanisms to said spring means whereby said mechanisms successively tension said spring means in opposite directions, means adapted to hold said spring means under tension, and means operable to release said holding means to permit said spring means to operate said shutter mechanism.

7. In apparatus of the class described, a shutter mechanism, resilient drive means therefor, said mechanism and drive means having a neutral equilibrium position, and actuating means for energizing said drive means, said actuating means comprising means for displacing said drive means a predetermined distance from equilibrium position, means for releasing said drive means, the latter passing in one direction through neutral position upon release, means for holding said released drive means from return motion toward neutral position, means for further displacing said released drive means away from neutral position, and means for releasing said holding means to permit movement of said drive means in the other direction through neutral position, said holding means being again operative to prevent return movement of said released drive means.

8. In apparatus of the class described, a shutter mechanism, resilient drive means therefor, said mechanism being directly connected to said drive means, the latter having a neutral equilibrium position corresponding to the exposure position of said shutter mechanism, actuating means for successively displacing said resilient drive means in opposite directions from said neutral position, means for releasing said drive means after each displacement, said drive means passing through neutral position upon release, and means for holding said drive means displaced from neutral position after each release thereof.

9. In a shutter mechanism, a shutter, resilient drive means, a direct drive connecting said drive means with said shutter whereby the exposure position of said shutter corresponds to the equilibrium position of said resilient drive, actuating means for displacing said drive from equilibrium position, means for releasing said drive for a single oscillation of simple harmonic motion through said equilibrium position to effect an exposure, and means for varying the initial displacement of said drive means from equilibrium position to control the speed at which said drive means passes through equilibrium position.

10. In apparatus of the class described, a shutter mechanism and actuating means therefor, said means comprising a spring drive, means for alternately tensioning said drive in opposite directions to cause the latter to alternately actuate said mechanism in opposite directions, and means for controlling the tension applied to said drive to thereby control the speed of operation thereof.

11. A shutter mechanism and means for successively actuating said mechanism for operation in opposite directions, said means comprising a spring drive, a direct drive from said spring drive to said shutter mechanism, means for alternately energizing said spring drive for operation in opposite directions, means for controlling the speed of operation of said spring drive, and means for holding said spring drive against movement until release thereof is desired.

12. In apparatus of the class described, a shutter mechanism, resilient drive means therefor, said mechanism being directly connected to said drive means and having a neutral equilibrium position corresponding to the exposure position of said shutter mechanism, actuating means for successively displacing said resilient drive means in opposite directions from said neutral position, means for releasing said drive means after each displacement, said drive means passing through neutral position upon release, means for holding said drive means displaced from neutral position after each release thereof, said holding means being rendered inoperative by said actuating means, and apparatus for holding said drive means when said first-named holding means is rendered inoperative.

13. In apparatus of the class described, a shutter mechanism, resilient drive means therefor, said mechanism and drive means having an equilibrium position corresponding to the exposure position of said shutter mechanism, and actuating means for successively displacing said resilient drive means in opposite directions from said neutral position and for releasing said drive means for movement through said neutral position for effecting an exposure after each displacement.

14. In camera apparatus, a shutter mechanism, resilient drive means directly and positively connected at all times to said mechanism, said drive means and said shutter mechanism being so constructed and arranged that when said drive means is in its equilibrium position said shutter mechanism is in its exposure position, actuating means for displacing said drive means in one direction relative to said equilibrium position, said mechanism when released being free to move in substantially a simple, harmonic motion through its equilibrium position to effect an exposure, and braking means rendered operable by said actuating means to hold said resilient means against return movement in the direction of equilibrium position.

15. In apparatus of the class described, shutter means, a spring drive connected to said shutter means, means for energizing said drive by displacing the latter from equilibrium position, means for holding said drive in displaced position, means operable to cause said holding means to release said drive, said drive when released being free to move in substantially a simple, harmonic motion to cause said shutter means to effect an exposure, and braking means operative to hold said drive against return movement after the latter has moved through one oscillation, said braking means being connected to said energizing means so as to be rendered operative by the latter at the completion of the energization of said drive.

16. In camera apparatus, a shutter mechanism, actuating means directly connected to said mechanism, means for energizing said actuating means, braking means holding said shutter mechanism against release, movable means holding said actuating means in energized position, mechanism operable to displace said movable means so as to control the energy stored in said actuating means prior to the release thereof, and means actuated by the operation of said last-named mechanism to render said braking means inoperative.

17. In apparatus of the class described, a shutter mechanism and means operatively connected to said mechanism to actuate the latter, said means comprising spring means, a pair of mechanisms, means drivably connected to said mechanisms to actuate the latter in opposite directions, means adapted to alternately connect said mechanisms to said spring means whereby said mechanisms successively tension said spring means in opposite directions, means adapted to hold said spring means under tension, and means operable to release said holding means to permit said spring means to operate said shutter mechanism.

18. In apparatus of the class described, a shutter mechanism, resilient drive means therefor, said mechanism being directly connected to said drive means, actuating means for successively displacing said drive means in opposite directions from the equilibrium position thereof, means for releasing said drive means after each displacement, said drive means passing through equilibrium position and effecting an exposure upon release, and means for holding said drive means displaced from equilibrium position after each release thereof.

19. In a shutter mechanism, a shutter, resilient drive means, a direct drive connecting said drive means with said shutter, said connecting drive being so constructed that the exposure position of said shutter corresponds with the equilibrium position of said resilient drive, actuating means for displacing said drive from equilibrium position, means for releasing said drive for motion through said equilibrium position to effect an exposure, and means for varying the initial displacement of said drive means from equilibrium position to control the speed at which said drive means passes through said equilibrium position.

20. In apparatus of the class described, shutter means, spring drive means for actuating said shutter means, means for directly and positively connecting said spring means to said shutter means at all times, said connecting means being so arranged that when said spring means is in its equilibrium position said shutter means is in its exposure position, means for energizing said spring means by displacng the latter from equilibrium position, said spring means being moved through its equilibrium position when released from said energizing means to cause said shutter means to effect an exposure, and means preventing return movement of said spring means in the direction of its equilibrium position after the release thereof.

RALPH R. CHAPPELL.
RUTGER B. COLT.